US008837819B1

(12) United States Patent
Lees et al.

(10) Patent No.: US 8,837,819 B1
(45) Date of Patent: Sep. 16, 2014

(54) SYSTEMS AND METHODS FOR FACILITATING IDENTIFICATION OF AND INTERACTION WITH OBJECTS IN A VIDEO OR IMAGE FRAME

(75) Inventors: Jennie Lees, Mountain View, CA (US); Jonathan Huang, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 261 days.

(21) Appl. No.: 13/440,901

(22) Filed: Apr. 5, 2012

(51) Int. Cl.
*G06K 9/00* (2006.01)
(52) U.S. Cl.
USPC .......................................................... 382/159
(58) Field of Classification Search
None
See application file for complete search history.

(56) References Cited

U.S. PATENT DOCUMENTS

| | | | |
|---|---|---|---|
| 2009/0240652 A1* | 9/2009 | Su et al. ............................. | 707/1 |
| 2010/0091330 A1* | 4/2010 | Marchesotti et al. ........ | 358/1.18 |
| 2011/0143728 A1* | 6/2011 | Holopainen et al. ....... | 455/414.1 |
| 2012/0232987 A1* | 9/2012 | Everingham ............... | 705/14.49 |

OTHER PUBLICATIONS

Jia Deng; Wei Dong; Socher, R.; Li-Jia Li; Kai Li; Li Fei-Fei, "ImageNet: A large-scale hierarchical image database," Computer Vision and Pattern Recognition, 2009. CVPR 2009. IEEE Conference on , vol., no., pp. 248,255, Jun. 20-25, 2009.*
B. C. Russell , A. Torralba , K. P. Murphy and W. T. Freeman Labelme: A database and web-based tool for image annotation, Tech. Rep., Massachusetts Inst. Technol. Lab Memo AIM-2005-025,, 2005.*

* cited by examiner

*Primary Examiner* — Jason M Repko
*Assistant Examiner* — Thomas A James
(74) *Attorney, Agent, or Firm* — Amin, Turocy & Watson, LLP

(57) ABSTRACT

Systems and methods for facilitating identification of and interaction with objects in a video frame are provided. In some embodiments, a system can include a computer-readable storage medium encoding computer executable components, and a processor that executes computer executable components encoded within the computer-readable storage medium. The components can include: a communication component that receives a video; a segmentation component that obtains a frame from the video; and a selection component that determines an object selected within the frame. The selection component can include a classifier trained using a probability map stored in the memory. The probability map can include information indicative of a likelihood that a pixel in the frame corresponds to the object, and can be generated based on crowdsourcing object differentiation.

21 Claims, 10 Drawing Sheets

SYSTEMS AND METHODS FOR FACILITATING IDENTIFICATION OF AND INTERACTION WITH OBJECTS IN A VIDEO OR IMAGE FRAME

TECHNICAL FIELD

This disclosure generally relates systems and methods facilitating identification of and interaction with objects in a video and/or image frame.

BACKGROUND

High value videos, images and movies often contain objects of interest to users viewing the videos, images and/or movie and to advertisers. Identification of and/or interaction with the objects can be challenging. Conventional approaches to identification and/or interaction with objects in a frame are complex, time consuming and can be unreliable. Accordingly, systems and methods facilitating identification of and interaction with objects in frames of media are desirable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

In one or more embodiments, the disclosed subject matter relates to a system that facilitates identification of and interaction with objects in a video frame, comprising: a computer-readable storage medium encoding computer executable components; and a processor that executes computer executable components encoded within the computer-readable storage medium. The computer executable components can include: a communication component that receives a video, and a segmentation component that obtains a frame from the video. The computer executable components can also include a selection component that determines an object selected within the frame. The selection component can include a classifier trained using a probability map stored in the memory. The probability map can include information indicative of a likelihood that a pixel in the frame corresponds to the object, and can be generated based, at least, on: information indicative of masking of a plurality of objects with one or more colors, the masking performed by a plurality of users and the plurality of objects being included in a scene of the frame; differentiation of the plurality of objects based, at least, on a level of commonality between the masking of the plurality of objects; and selection of information associated with masked regions of the frame wherein the level of commonality between the masking is greater than or equal to a predefined threshold.

In one or more embodiments, the disclosed subject matter relates to a method including: receiving a video; obtaining a frame from the video; and determining an object selected within the frame. In some embodiments, the determining can include searching a probability map for the object. The probability map can be generated based, at least on information indicative of masking of a plurality of objects with one or more colors. The masking can be performed by a plurality of users and the plurality of objects can be included in a scene of the frame. The determining can also include differentiation of the plurality of objects based, at least, on a level of commonality between the masking of the plurality of objects. The determining can also include selection of information associated with masked regions of the frame wherein the level of commonality between the masking is greater than or equal to a predefined threshold.

In one or more embodiments, the disclosed subject matter relates to another method including: differentiating the plurality of objects based, at least, on a level of commonality between the masking of the plurality of objects; discarding information associated with masked regions of the frame wherein the level of commonality between the masking is less than a predefined threshold; and generating a probability map based, at least, on the level of commonality between the masking, the probability map comprising information indicative of a likelihood that a location in the frame corresponds to a particular one of the plurality of objects.

In one or more embodiments, another method can include: receiving information indicative of a selection of a location in a frame; determining a pixel associated with the location in the frame; and determining an object associated with the pixel based, at least, on evaluating a probability map of the frame. Generating the probability map can include: receiving information indicative of masking of a plurality of objects with one or more colors, the masking performed by a plurality of users and the plurality of objects being included in a scene of the frame; differentiating the plurality of objects based, at least, on a level of commonality between the masking of the plurality of objects; discarding information associated with masked regions of the frame wherein the level of commonality between the masking is less than a predefined threshold; and generating the probability map based, at least, on the level of commonality between the masking, the probability map comprising information indicative of a likelihood that a pixel in the frame corresponds to the object.

In one or more embodiments, another system can include: a computer-readable storage medium encoding computer executable components; and a processor that executes computer executable components encoded within the computer-readable storage medium. The computer executable components can include a communication component that: distributes a plurality of frames of a video to a plurality of users, the plurality of frames depicting a same scene; and receives information indicative of masking of a plurality of objects with one or more colors, the masking performed by the plurality of users and the plurality of objects being included in the scene. The computer executable components can also include a video object recognition component that: differentiates the plurality of objects based, at least, on a level of commonality between the masking of the plurality of objects; discards information associated with masked regions of the frame wherein the level of commonality between the masking is less than a predefined threshold; and generates a probability map based, at least, on the level of commonality between the masking, the probability map comprising information indicative of a likelihood that a location in the frame corresponds to a particular one of the plurality of objects.

In one or more embodiments, another method includes: receiving information indicative of a selection of an image in a media frame; identifying, from a probability map, a pixel associated with the image, the probability map being generated based, at least, on crowdsourcing object differentiation; identifying, from the probability map, an object associated with the pixel, the object being included in the image in the media video frame; and providing selected advertisement or service based, at least, on the object.

Toward the accomplishment of the foregoing and related ends, the one or more embodiments include the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
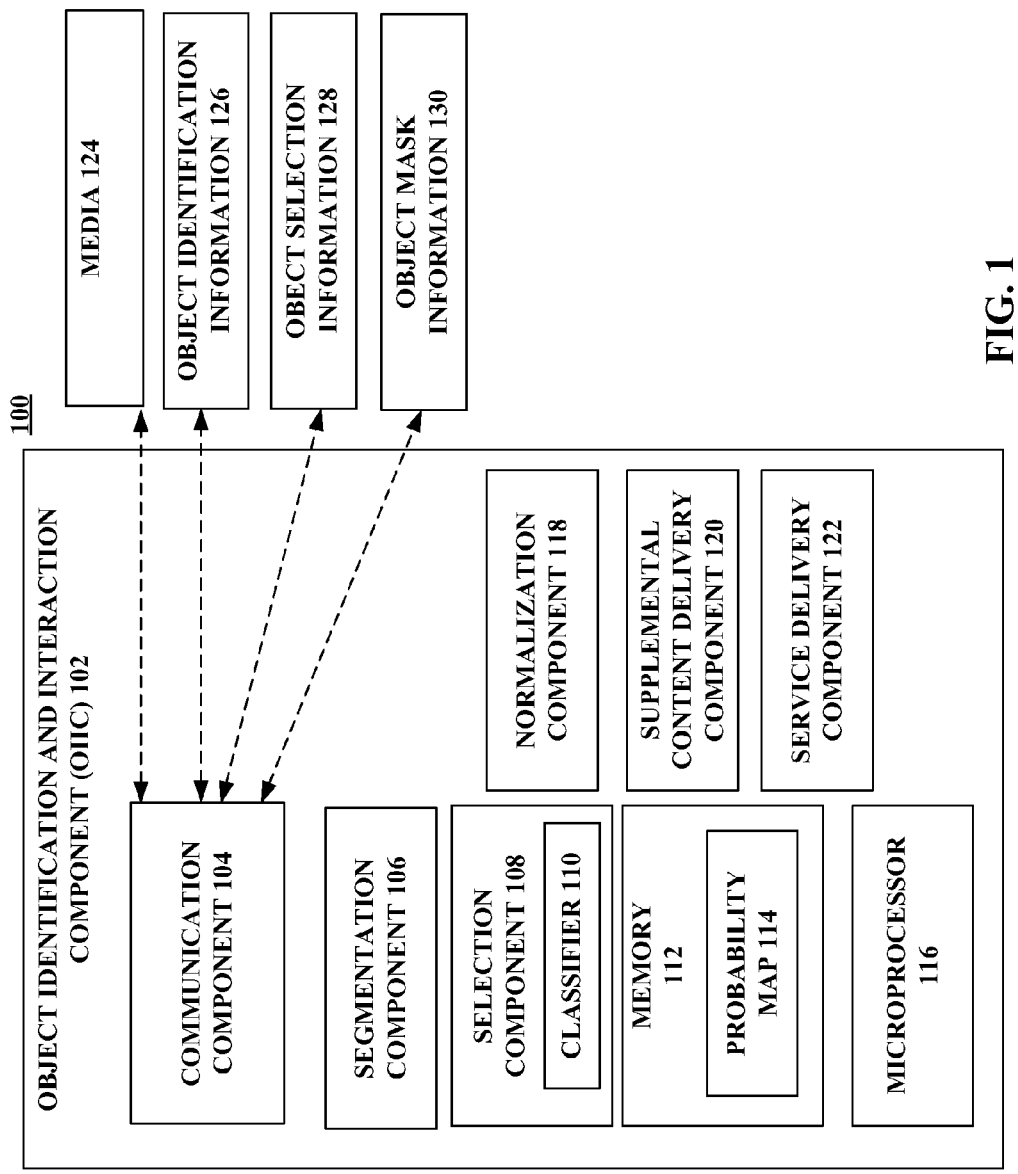
FIG. 1 is an illustration of a block diagram of an exemplary non-limiting system that facilitates object identification in a video and/or image frame in accordance with this disclosure.

Various embodiments are now described with reference to the drawings, wherein like reference numerals are used to refer to like elements throughout. In the following description, for purposes of explanation, numerous specific details are set forth in order to provide a more thorough understanding of one or more embodiments. It is be evident, however, that such embodiments can be practiced without these specific details. In other instances, structures and devices are shown in block diagram form in order to facilitate describing one or more embodiments.

Systems and methods disclosed herein relate to identification of and/or interaction with one or more objects in a frame. The frame can be a video, movie and/or image (e.g., camera image) frame. The systems and methods can employ crowdsourcing object differentiation, and generation of an object probability map based on the object differentiation. The crowdsourcing object differentiation can be employed to determine that different items in a frame correspond to different objects. For example, the probability map can include a representation of probabilities that respective portions (e.g., pixels) of the frame correspond to particular objects. The higher the probability, the greater the likelihood that a particular pixel is associated with a particular object.

In various embodiments, the probabilities can be represented as numerical values, a color on a spectrum of colors, an intensity of color of a particular color or the like. For example, the probabilities can be represented as an intensity of color such that in portions of the map corresponding to a high likelihood that the pixel corresponds to an object, the color of the object can be darker while for pixels that are not likely to correspond to an object, the color of the object can be lighter. As such, near the perimeter of an object, the object can be represented as a lighter color (or a lighter hue of a particular color) and near the center of an object, the object can be represented as a darker color (or a darker hue of the particular color).

In some embodiments, a system such as that described in this disclosure can include a communication component that receives media, a segmentation component that obtains a frame from the media and a selection component including a classifier that determines an object selected within the frame. The classifier can be trained using a probability map generated according to the methods described in this disclosure. Advertisement and/or services can be offered to a user based on the selected object (or the location of the object selected).

The systems and methods can advantageously facilitate identification of and/or interaction with an object in a media frame. The systems and methods can also enable offer of advertisement and/or services based on the object selected (or the location of the object selected).

FIG. 1 is an illustration of a block diagram of an exemplary non-limiting system that facilitates object identification and/or interaction in a frame. The system (e.g., system 100) can include an objection identification (ID) and interaction component (OIIC) 102, media 124, object ID information 126, object selection information 128 and/or object mask information 130. The media 124 and/or object mask information 130 can be stored at computer-readable storage medium 112 of the OIIC 102. While the system 100 is shown including OIIC 102, media 124, object ID information 126 and/or object selection information 128, in some embodiments, the system 100 includes only the OIIC 102. In these embodiments, the media 124 and/or object mask information 130 can be stored at a location remote from the OIIC 102 and accessed over a network (e.g., the Internet).

As shown in FIG. 1, in some embodiments, the OIIC 102 can include a communication component 104, a segmentation component 106, a selection component 108, a classifier 110, a computer-readable storage medium 112, a probability map 114, a processor 116, a normalization component 118, a supplemental delivery component (SuDC) 120 and/or a service delivery component (SeDC) 122. In various embodiments, one or more of the communication component 104, segmentation component 106, selection component 108, classifier 110, computer-readable storage medium 112, probability map 114, processor 116, normalization component 118, SuDC 120 and/or SeDC 122 can be electrically and/or communicatively coupled to one another to perform one or more of the functions of the OIIC 102 described in this disclosure.

The communication component 104 can receive media. For example, communication component 104 can receive media 124. In various embodiments, media 124 can include, but is not limited to, a movie, video and/or image (e.g., camera image). The communication component 104 can also receive object mask information 130. In various embodiments, the communication component 104 can output object selection information 128 and/or object ID information 126. In some embodiments, the communication component 104 can receive and/or output information associated with offering or selling advertisement and/or services based on objects in the media 124.

The segmentation component 106 can obtain a frame from the media 124. The segmentation component 106 can obtain the frame by any number of different methods for extracting a frame from media.

The communication component 104 can output the frame of the media 124. In various embodiments, the communication component 104 can output a number of the same frame depicting the same scene. In some embodiments, the frame can be output to an automated system for performing automated masking of the one or more objects in the frame. However, in other embodiments, the frame can be output to one or more human users for crowdsourcing. Crowdsourcing can include manual masking of objects in the frame in one or more colors by the one or more human users.

In various embodiments, the frame can be masked in one or more patterns, colors, and/or hues of a particular color. For example, in some embodiments, one or more of the users can color every discrete object in the scene of the frame in a different color. The objects can be masked employing tools and/or sample diagrams previously supplied to the users for coloring each object individually.

The communication component 104 can receive a number of masked frames depicting the same scene having objects masked, or colored, in different color combinations. For example, in some embodiments, 60% of a leftmost object in the frame can be colored red while 20% of the leftmost object in the frame can be colored blue and 10% of the leftmost object in the frame can be colored yellow. Accordingly, crowdsourcing can be employed to generate a set of masked frames having different color combinations for the objects in the scene displayed.

While crowdsourcing is described for generation of the masked frames, in some embodiments, a set of masked frames can be colored in different colors by an automated system for generating scenes in different object color combinations.

In either embodiment, as described herein, the masked frames and/or information describing the masking can correspond to the object mask information 130 received and/or processed by the OIIC 102. The object mask information 130 and/or masked frames can be stored at the OIIC 102, and/or stored remotely from the OIIC 102 and accessed by the OIIC 102.

Figure 2A:
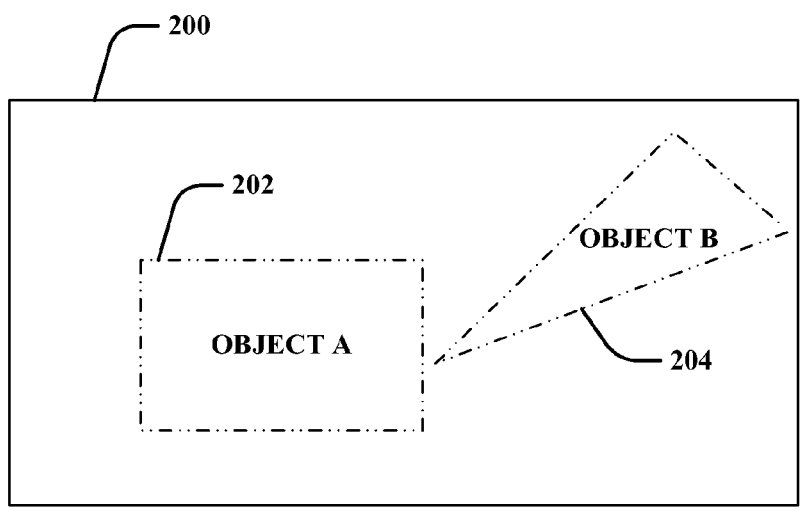
FIGS. 2A, 2B and 2C are illustrations of schematic diagrams of exemplary masked frames including objects for identification and/or interaction in accordance with this disclosure.
Figure 2B:
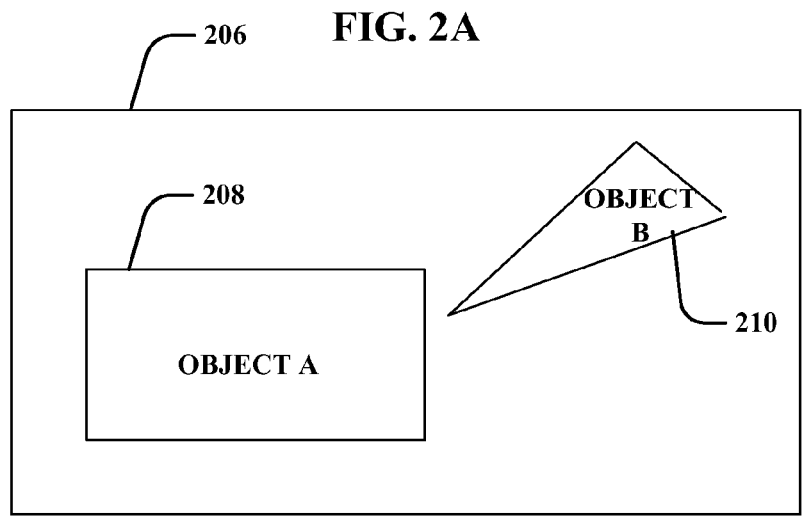
Figure 2C:
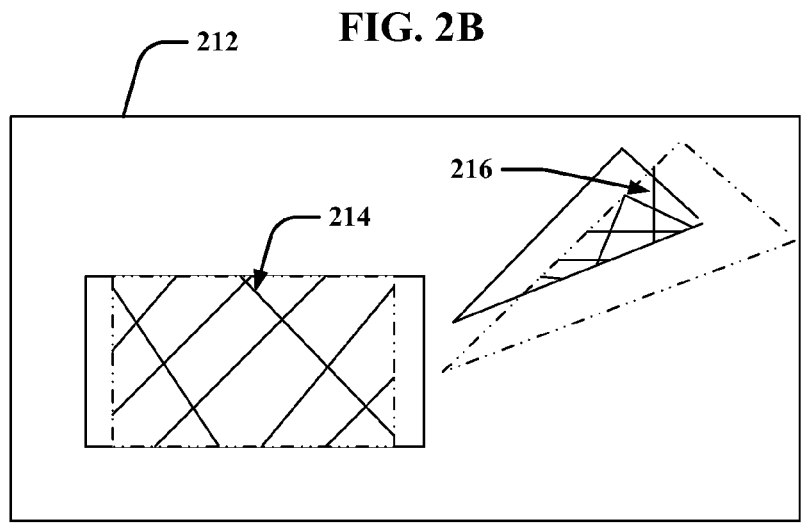

FIGS. 2A, 2B and 2C are illustrations of schematic diagrams of exemplary masked frames including objects for identification and/or interaction. As described above, the masked frames can be received and/or processed by the OIIC 102.

Turning first to FIG. 2A, FIG. 2A is an illustration of frame 200 including a first input of masks for object A and object B. In embodiments, wherein crowdsourcing is employed, the input can be received from a first human user, for example. The masks can be indicated by depicting objects A and B in one or more colors (determined by the user masking objects A and B). The outer edges of the masks of objects A and B in frame 200 are indicated as shown at 202 and 204.

Similarly, turning to FIG. 2B, the outer edges of the masks of objects A and B in frame 206 are as shown in FIG. 2B at 208 and 210. While the drawings depict maskings for two users, the OIIC 102 can process and/or evaluate any number of masked frames (or object mask information 130 for masked frames) and/or any number of objects within the masked frames.

The OIIC 102 can compare the masks for objects A and B to determine the overlapping regions of masks for object A and to determine the overlapping regions for masks of object B. The overlapping regions 214, 216 for the objects can be considered to be the portion of the frame of the media 124 that can be associated with the objects A and B. Accordingly, the pixels corresponding to the region 214 can be identified with object A and the pixels corresponding to region 216 can be identified with object B.

The OIIC 102 can differentiate the objects A and B based on a level of commonality between the masking of the objects. The level of commonality can be a function of the amount of overlap between the masks applied to the same corresponding objects. For example, the area of greatest overlap can be associated with a higher level of commonality than an area of overlap wherein only one user has masked the object in that region (e.g., pixel). As such, the areas in the middle of the object may have a strong overlap from one masked frame to another while the boundary regions (e.g., outer edges) of the objects may have less overlap from one masked frame to another.

The OIIC 102 can select the information (e.g., pixels) associated with masked regions of the frame in which the level of commonality is greater than or equal to a predefined threshold. These pixels can be associated with a high probability in the probability map 114. Accordingly, the probability map 114 can include information indicative of one or more pixels of the frame, and an associated probability that the pixel corresponds to an object. The probability can increase as the level of commonality increases in some embodiments.

Figure 3:
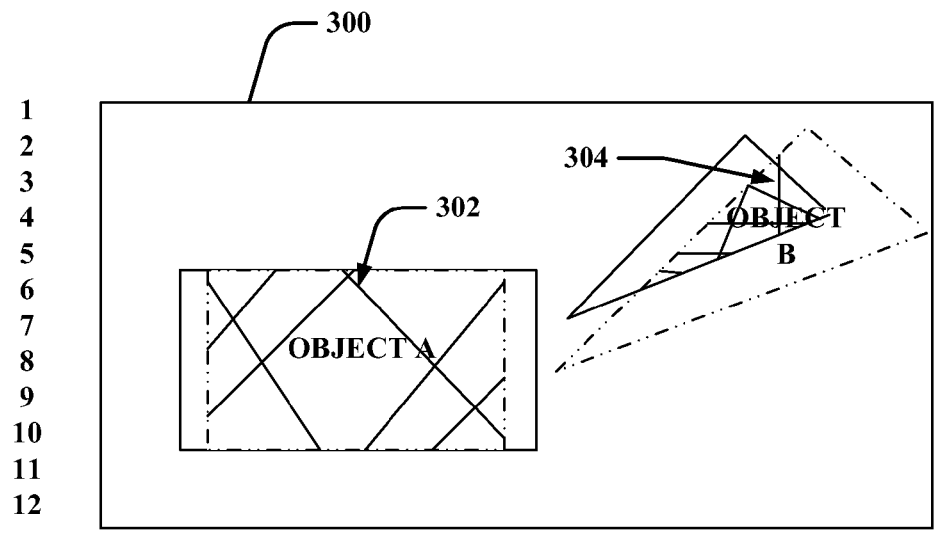
FIG. 3 is an illustration of an exemplary non-limiting probability map that facilitates identification of and/or interaction with an object in a frame in accordance with this disclosure.

FIG. 3 is an illustration of an exemplary non-limiting diagram showing a level of commonality between masked objects for facilitating identification of and/or interaction with an object in a frame. Table 1 includes various selected values in an exemplary probability map. The level of commonality between objects can be described in greater detail with reference to FIGS. 1, 2A, 2B and 3 and Table 1 below.

As shown in FIG. 3 and Table 1, when viewed collectively, a map of probabilities can be constructed indicating that a portion of the frame (e.g., a pixel) should be associated with a particular object. The higher the probability, the greater the likelihood that a particular pixel should be associated with the particular object. The values included are merely exemplary to illustrate the possible contents of a probability map and the relationship between the pixel number of a frame, and probabilities that the pixel number corresponds to an object of the frame. Numerous different values can exist and are envisaged in this disclosure.

As shown in FIG. 3 and Table 1 viewed collectively, the greater the level of overlap (e.g., commonality) between mask locations for an object, the greater the probability that a pixel value at the mask location corresponds to a particular object.

TABLE 1

| | Probability Map | | | |
|---|---|---|---|---|
| Pixel number (x,y) | Object Identifier | Probability | Object Identifier | Probability |
| (1, 1) | Object A | 0 | Object B | 0 |
| (2, 20) | Object A | 0 | Object B | .9 |
| (2, 21) | Object A | 0 | Object B | .95 |
| (3, 20) | Object A | 0 | Object B | 1.0 |
| (4, 21) | Object A | 0 | Object B | 1.0 |
| (5, 9) | Object A | .9 | Object B | 0 |
| (6, 10) | Object A | 1.0 | Object B | 0 |
| (7, 16) | Object A | .9 | Object B | 0 |
| (7, 17) | Object A | .3 | Object B | .7 |
| (8, 5) | Object A | .7 | Object B | 0 |
| (9, 11) | Object A | 1.0 | Object B | 0 |
| (10, 11) | Object A | .8 | Object B | 0 |
| (11, 14) | Object A | .5 | Object B | 0 |
| (12, 19) | Object A | 0 | Object B | 0 |

For example, as shown in Table 1, the probability that pixel value (1,1) corresponds to either object A or object B of FIG. 3 is approximately 0 as neither object is in such region of the frame. For pixel value (2,20), the probability that the pixel value corresponds to object B is 0.9 percent due to the amount of overlap in the masking of object B. The greater the overlap for the object in such masked location, the greater the probability that a pixel value corresponds to a particular object. Other exemplary values are included in Table 1 to illustrate the concept of mapping probabilities to pixel numbers for particular objects. In various embodiments, the probabilities may not add up to 1.0 for a particular pixel as some pixels may be located in regions wherein masking is absent for one or more of the objects, when considered collectively across all masked frames.

While not described in detail, in some embodiments, a map for performing object differentiation can be generated based on computer color vision techniques and/or based on techniques that are not probability-based.

Also, although the probabilities are described and shown in Table 1 as numerical values, in various embodiments, the probability map can be represented as a frame depicting the objects in the frame with the objects masked, or colored, in one or more colors on a spectrum of colors and/or with the objects masked, or colored, in a particular intensity of a color for a particular color. For example, the probabilities can be represented as an intensity of color such that in portions of the map corresponding to a high likelihood that the pixel corresponds to an object, the color of the object can be darker while for pixels that are not likely to correspond to an object, the color of the object can be lighter. As such, near the perimeter of an object, the object can be represented as a lighter color (or a lighter hue of a particular color) and near the center of an object, the object can be represented as a darker color (or a darker hue of the particular color).

In various embodiments, normalization can be employed to process the masked frames. Normalization can be performed per object in the frame, for example. In some embodiments, the normalization component 118 of the OIIC 102 can normalize, per object, one or more of the colors in the scene of the masked frames. The normalization component 118 can then extract individual colors from the frames, and form separate color independent layers. In various embodiments, a color independent layer can be represented as an electronic representation of a layer of information, or "electronic layer").

For example, with reference to FIGS. 2A and 2B, a first user can color object A 202 blue while a second user can color object A 208 red. To normalize the color used per object, for example, for object A, the normalization component 118 can separate each of the masked frames into individual electronic cels composed of only one color. Each electronic cel for a frame masked by a particular user can be compared to all other electronic cels for each other user.

The normalization component 118 can identify the electronic cel with the greatest amount of overlap. The normalization component 118 can compare the amount of overlap between an electronic cel from a user and each other electronic cel from other users to a threshold. The electronic cel having the greatest overlap can be selected. Electronic cels that do not have an overlap that is greater than or equal to the threshold can be rejected.

As such, the normalization component 118 can identify and match different objects in the frame based on whether the level of overlap is greater than or equal to the threshold. The selected electronic cel can be employed to provide information such as the probability that an object is located in a particular location within the frame, for example.

The information (e.g., location and/or object information) describing selected electronic cels and/or, in some embodiments, any non-rejected electronic cels, can be included as part of a list of objects in the frame. The list of objects can include corresponding location information for the object. For example, the location information can include, but is not limited to, pixel values associated with the objects. Accordingly, the non-rejected electronic cels can be employed to identify objects (and the corresponding locations of the objects).

A probability map can be generated based on the frequency with which the electronic cel in a masked frame overlaps with other electronic cels from other users. For example, a location of the frame at which a color is strongest can correspond to the highest probability that a selection of a pixel in that area corresponds to a particular object. Similarly, in locations of the frame at which a color is less strong, the probability can be lower that selection of a pixel in that area corresponds to a particular object.

Turning back to FIG. 1, the OIIC 102 can also include a selection component 108. The selection component 108 can include the classifier 110, as shown in FIG. 1. The classifier 110 can determine an object corresponded to a selection of an area of a pixel received by the communication component 104 of the OIIC 102. In various embodiments, the classifier 110 can be trained using the probability map 114 described in this disclosure.

For example, employing the probability map 114, upon receipt of media 124 at the OIIC 102, and/or receipt of object selection information 128 (e.g., information indicating selection of a location or portion of a frame), the classifier 110 can determine the object selected, if any. The object selection information 128 can be indicative of a selection of a portion of the frame made by a user. By way of example, but not limitation, the object selection information 128 can be generated indicating a portion of a frame clicked on or otherwise selected by a user. In some embodiments, the selection can be via an input from keyboard, computer mouse, audio speaker identifying a location of interest, or the like.

The classifier 119 can apply the object selection information 114 to the probability map 114 to perform object differentiation. For example, the classifier 110 can perform classification of the object (or retrieval of information about the object) by selecting an object having a greatest probability of corresponding to the location and/or portion of the frame selected by the user. In some embodiments, no object corresponds to the location and/or portion of the frame selected by the user, and the classifier 110 can determine such information as well.

The OIIC 102 can output object ID information 126 identifying the object selected by the user (as determined by the classifier 110).

The OIIC 102 can generate the object ID information 126. In some embodiments, the OIIC 102 can generate the object ID information 126 based on object selection information 128 received at the OIIC 102 and employing the probability map 114 to identify the object selected.

In various embodiments, the SuDC 120 can identify an advertisement of possible interest to the user based on the object determined to be selected by the user. In some embodiments, the SuDC 120 can deliver offer for sale and/or display the advertisement to the user selecting the object in the frame based on the object determined to be selected by the user.

In various embodiments, the SeDC 122 can identify a service of possible interest to the user based on the object determined to be selected by the user. In some embodiments, the SuDC 120 can deliver offer for sale and/or display a service (or information about a service) to the user selecting the object in the frame based on the object determined to be selected by the user. For example, contact, location and/or pricing information or coupons can be provided for a service provider and/or for a service.

The computer-readable storage medium 112 can store computer-executable instructions and/or information for performing the functions described in this disclosure with reference to any of the systems and/or methods disclosed. For example, in some embodiments, the computer-readable storage medium 112 can store the probability map 114. As another example, the computer-readable storage medium 112 can store computer-executable instructions in some embodiments, for performing the functions of the OIIC 102. In various embodiments, the computer-readable storage medium 112 can be a computer-readable medium encoding computer executable components. In some embodiments, the computer-readable storage medium 112 can be a computer memory.

Processor 116 can perform one or more of the functions described in this disclosure with reference to any of the systems and/or methods disclosed. For example, the processor 116 can execute computer executable components encoded within the computer-readable medium.

FIGS. 4, 5, 6A, 6B and 7 are illustrations of exemplary flow diagrams of methods that facilitate identification of and/or interaction with an object in a frame.

Figure 4:
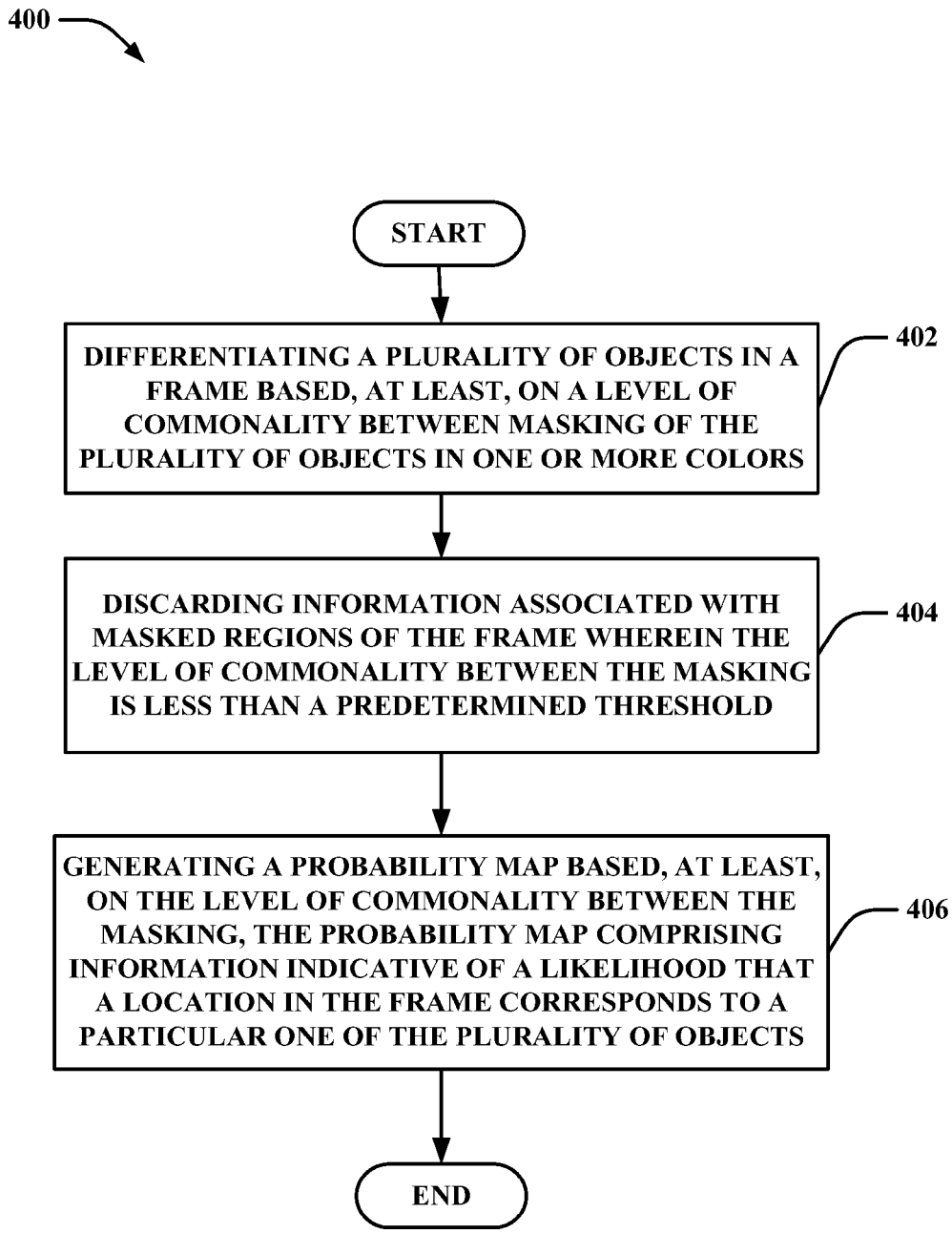
FIGS. 4, 5, 6A, 6B and 7 are illustrations of exemplary flow diagrams of methods that facilitate identification of and/or interaction with an object in a frame in accordance with this disclosure.

Turning first to FIG. 4, at 402, method 400 can include differentiating the plurality of objects based, at least, on a level of commonality between the masking of the plurality of objects (e.g., using the selection component 108).

At 404, method 400 can include discarding information associated with masked regions of the frame wherein the level of commonality between the masking is less than a predefined threshold (e.g., using the selection component 108).

At 406, method 400 can include generating a probability map based, at least, on the level of commonality between the masking (e.g., using the selection component 108). In some embodiments, the probability map can be probability map 114 and can include information indicative of a likelihood that a location in the frame corresponds to a particular one of the plurality of objects.

Although not shown, in some embodiments, method 400 can include extracting a frame from the video (e.g., using the segmentation component 106), and distributing a plurality of frames of a video to a plurality of users (e.g., using the communication component 104). The plurality of frames can depict the same scene and/or include the same set of objects. Although also not shown, method 400 can also include receiving information indicative of masking of a plurality of objects with one or more colors (e.g., using the communication component 104). The masking can be performed by the plurality of users in various embodiments.

Figure 5:
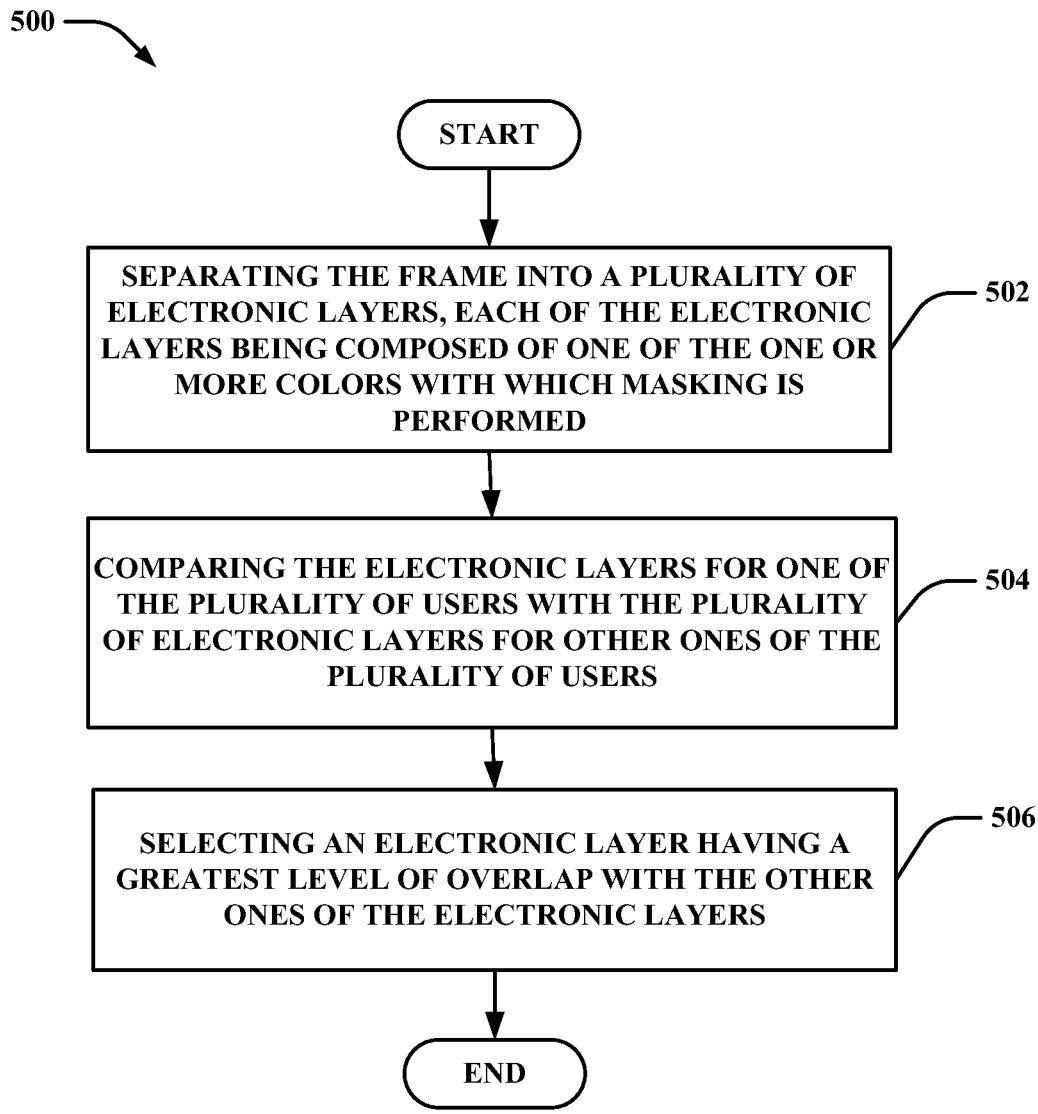

Turning now to FIG. 5, in some embodiments, differentiating at 306 of method 400 can include normalizing the one or more colors associated with the plurality of objects (e.g., using the normalization component 118). The normalizing can include (for one or more of the plurality of masked frames), at 502, separating the frame into a plurality of electronic layers (e.g., using the normalization component 118). The electronic layers can be composed of one of the one or more colors with which masking is performed.

At 504, method 500 can include comparing the electronic layers for one of the plurality of users with the plurality of electronic layers for other ones of the plurality of users (e.g., using the normalization component 118).

At 506, method 500 can include selecting an electronic layer having a greatest level of overlap with the other ones of the electronic layers (e.g., using the normalization component 118).

Figure 6A:
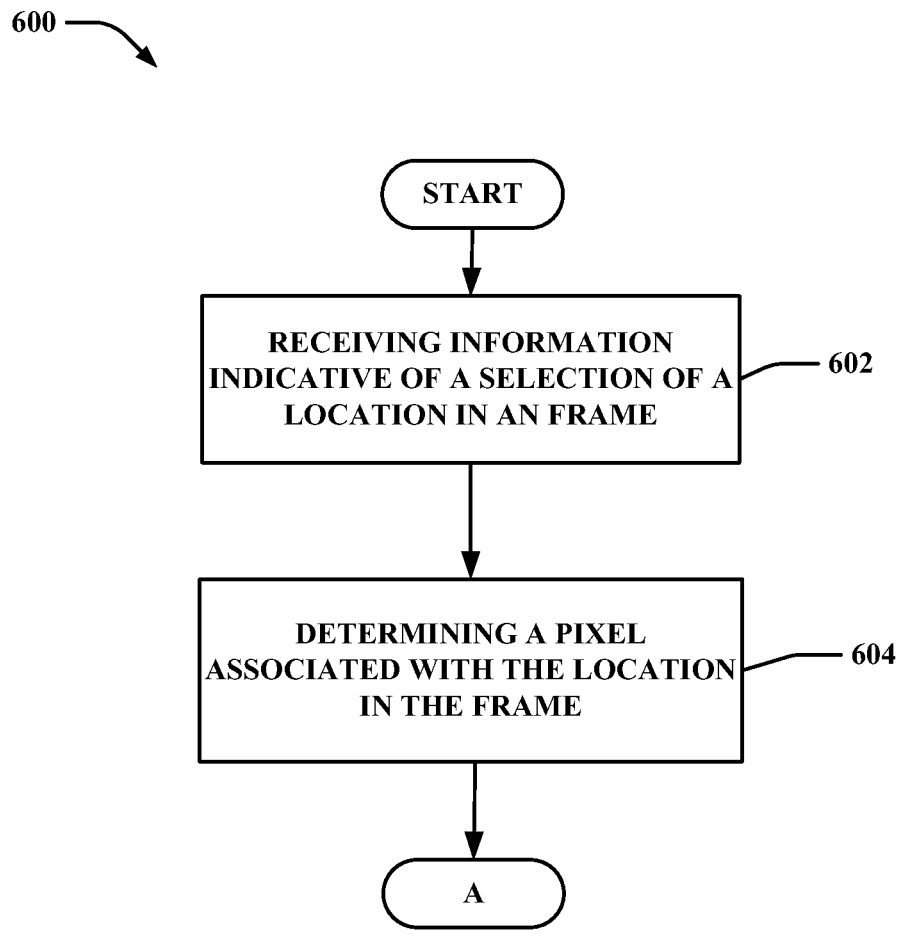
Figure 6B:
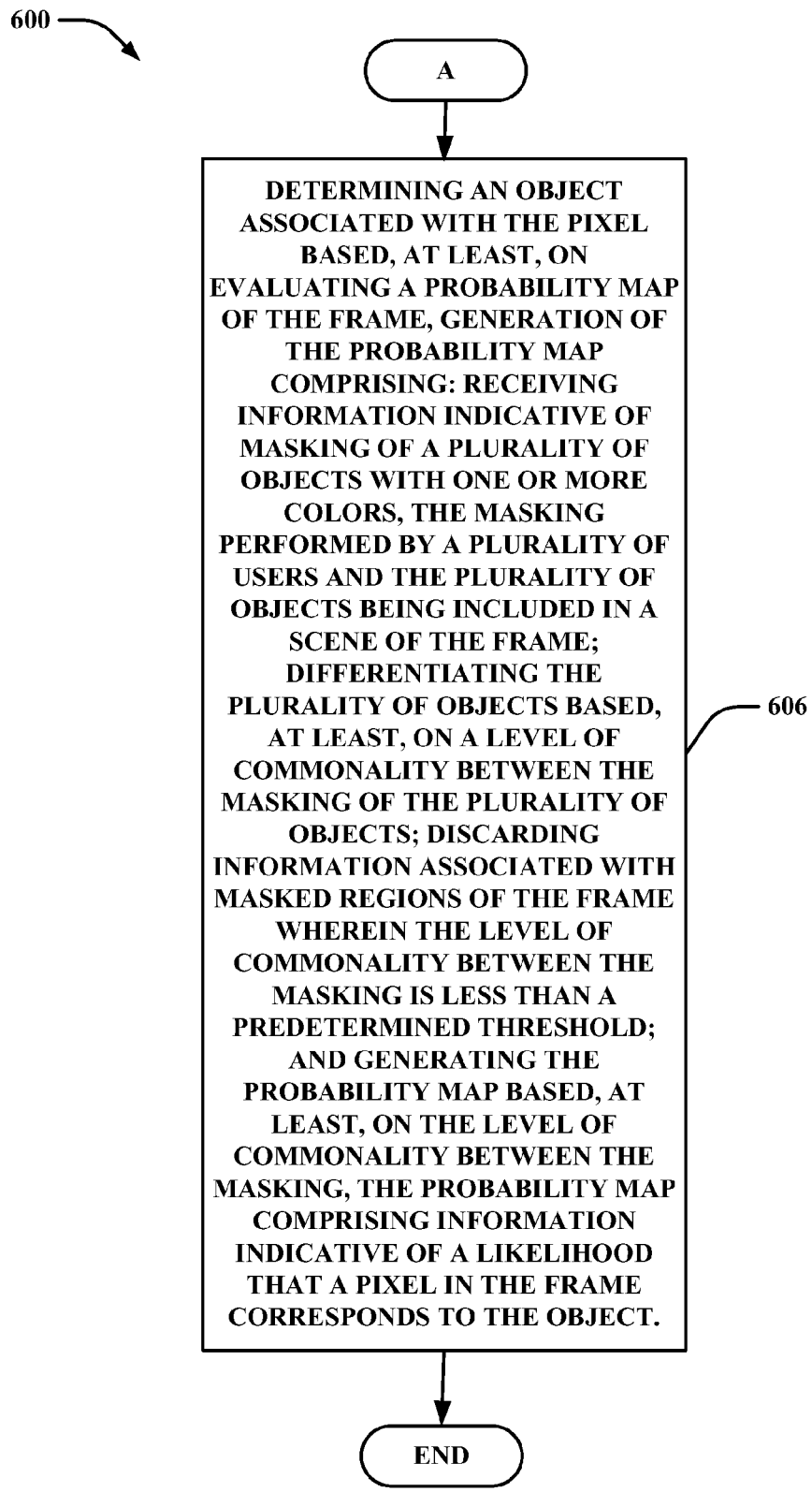

Turning now to FIGS. 6A and 6B, at 602, method 600 can include receiving information indicative of a selection of a location in a frame (e.g., using communication component 104). For example, a user viewing a video can select (e.g., click on or highlight) an area of a location in the frame.

At 604, method 600 can include determining a pixel associated with the location in the frame (e.g., using the classifier 110).

At 606, method 600 can include determining an object associated with the pixel based, at least, on evaluating a probability map of the frame (e.g., using the classifier 110). By way of example, but not limitation, the OIIC 102 can determine that the pixel selected corresponds to a particular object in the video frame. The probability map can be probability map 114 in some embodiments. Generating the probability map can include 404, 406, 408 and 410 of method 400 in some embodiments.

Although not shown, in some embodiments, method 600 can also include delivering services (e.g., using the SeDC 122) and/or offering advertisement (e.g., using the SuDC 120) based on the object selected. For example, an advertisement can be offered for sale based on the object determined to have been selected in the frame of the video (e.g., using the SuDC component 120). In some embodiments, method 600 can also include delivering a service based the object determined to have been selected in the frame of the video (e.g., using the SeDC 122). For example, the advertisement and/or service can be related to the object selected. By way of example, but not limitation, if a car is selected in the video frame, advertisement related to cars for sale and/or services such as local car dealership information can be delivered.

Figure 7:
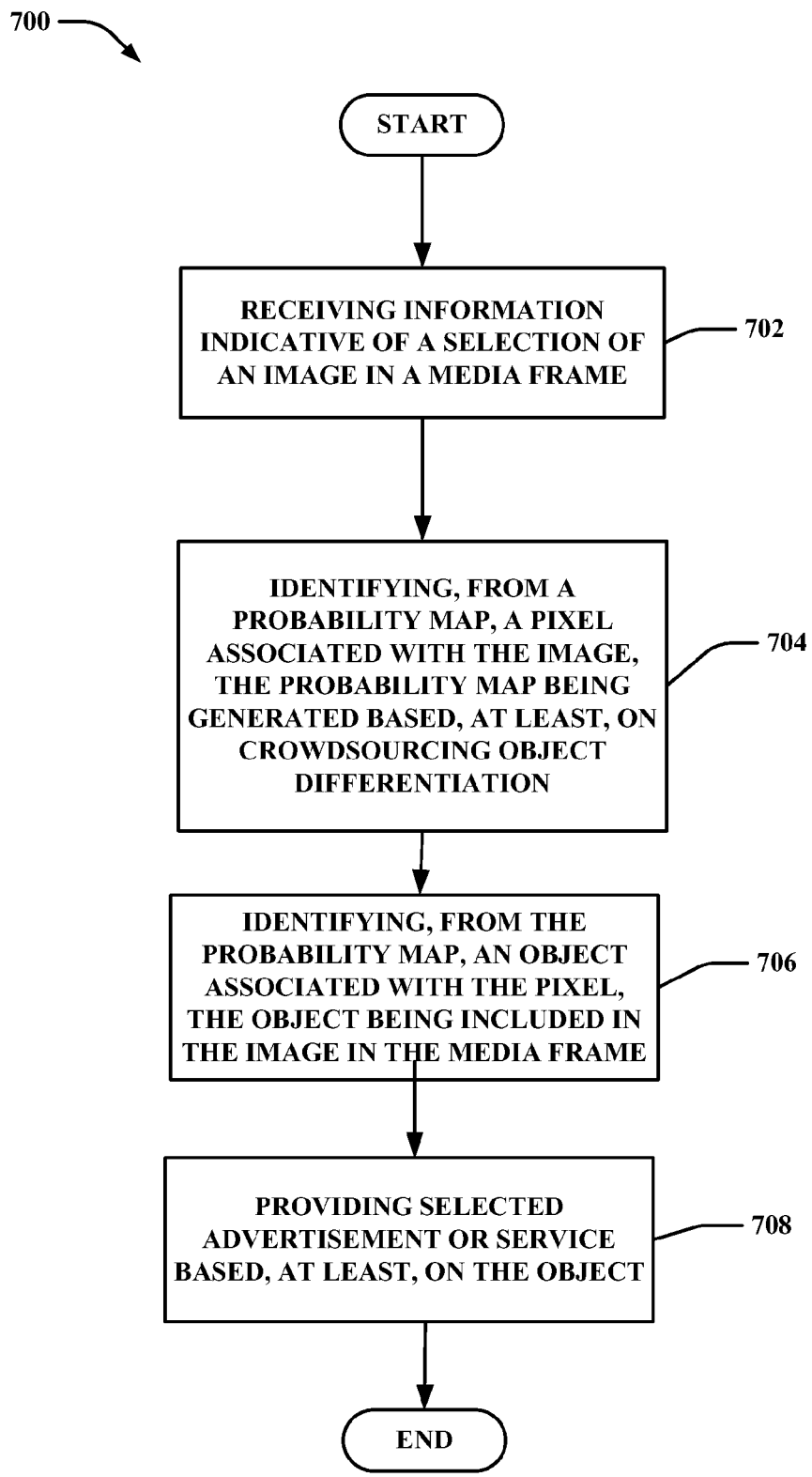

Turning now to FIG. 7, at 702, method 700 can include receiving information indicative of a selection of an image in a media frame (e.g., using communication component 104). In various embodiments, the media can include, but is not limited to, a movie, a video or an image generated by a camera or the like.

At 704, method 700 can include identifying, from a probability map, a pixel associated with the image (e.g., using the OIIC 102). The probability map can be generated based, at least, on crowdsourcing object differentiation. In some embodiments, crowdsourcing object differentiation can include determining that different items of a frame correspond to different objects. In various embodiments, the probability map can be probability map 114 discussed with reference to FIG. 1.

At 706, method 700 can include identifying, from the probability map, an object associated with the pixel (e.g., using the OIIC 102). The object can be included in the image in the media frame.

At 708, method 700 can include providing selected advertisement (e.g., using the SuDC 120) or service (e.g., using the SeDC 122) based, at least, on the object.

Exemplary Networked and Distributed Environments

One of ordinary skill in the art can appreciate that the various embodiments described in this disclosure can be implemented in connection with any computer or other client or server device, which can be deployed as part of a computer network or in a distributed computing environment, and can be connected to any kind of data store where media may be found. In this regard, the various embodiments described in this disclosure can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 8:
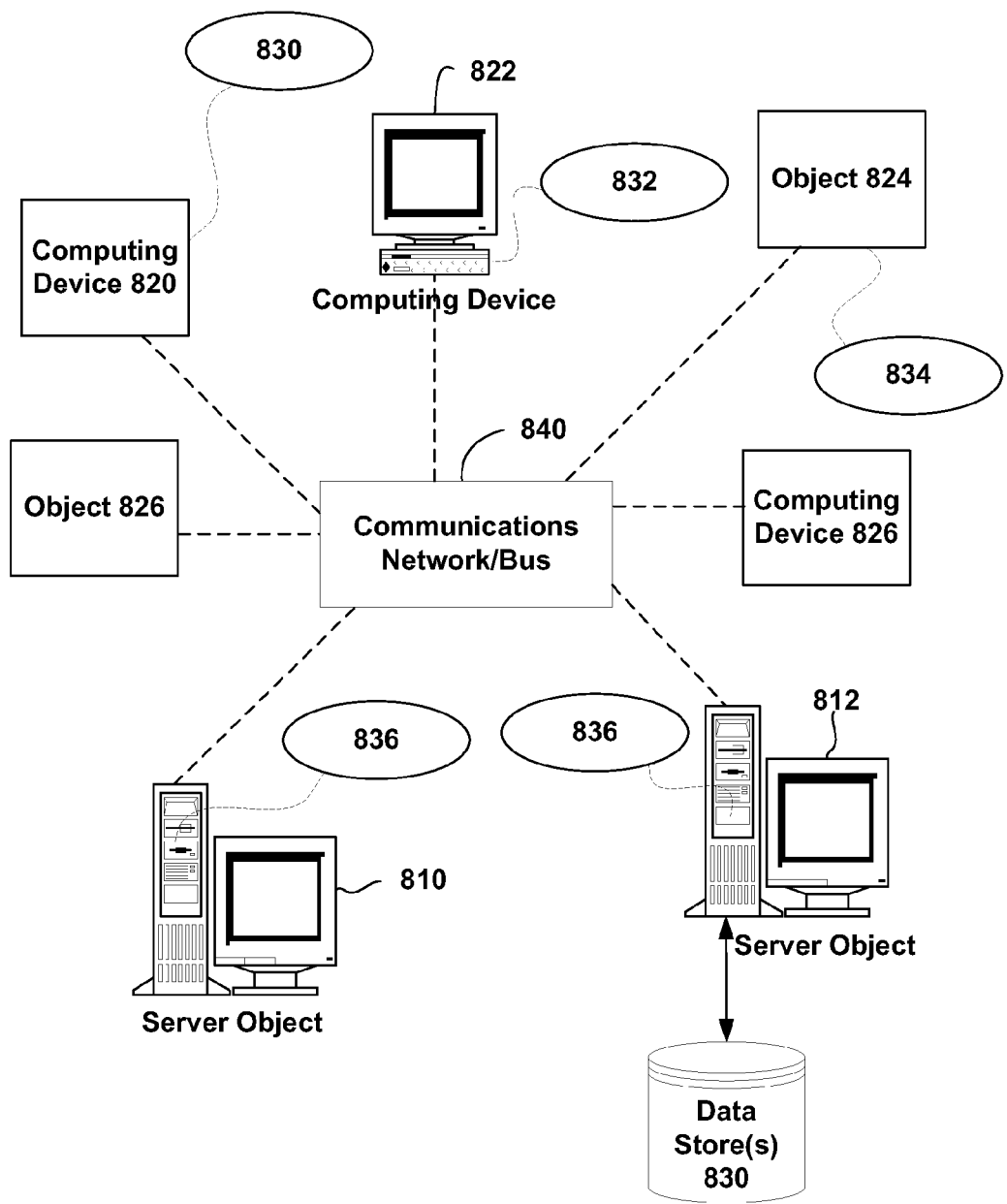
FIG. 8 is an illustration of a schematic diagram of an exemplary networked or distributed computing environment for implementing one or more embodiments described in this disclosure.

FIG. 8 provides a schematic diagram of an exemplary networked or distributed computing environment in which embodiments described in this disclosure can be implemented. The distributed computing environment includes computing objects 810, 812, etc. and computing objects or devices 820, 822, 824, 826, 828, etc., which can include programs, methods, data stores, programmable logic, etc., as represented by applications 830, 832, 834, 836, 838. It can be appreciated that computing objects 810, 812, etc. and computing objects or devices 820, 822, 824, 826, 828, etc. can include different devices, such as personal digital assistants (PDAs), audio/video devices, mobile phones, MPEG-1 Audio Layer 3 (MP3) players, personal computers, laptops, tablets, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, network 840 can include other computing objects and computing devices that provide services to the system of FIG. 8, and/or can represent multiple interconnected networks, which are not shown. Each computing object 810, 812, etc. or computing objects or devices 820, 822, 824, 826, 828, etc. can also contain an application, such as applications 830, 832, 834, 836, 838, that might make use of an application programming interface (API), or other object, software, firmware and/or hardware, suitable for communication with or implementation of the various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "module," "system," and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In a client/server architecture, particularly a networked system, a client can be a computer that accesses shared network resources provided by another computer, e.g., a server. In the illustration of FIG. 8, as a non-limiting example, computing objects or devices 820, 822, 824, 826, 728, etc. can be thought of as clients and computing objects 810, 812, etc. can be thought of as servers where computing objects 810, 812, etc. provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances. Any of these computing devices can process data, or request transaction services or tasks that can implicate the techniques for systems as described in this disclosure for one or more embodiments.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described in this disclosure can be provided standalone, or distributed across multiple computing devices or objects.

In a network environment in which the communications network/bus 840 can be the Internet, for example, the computing objects 810, 812, etc. can be Web servers, file servers, media servers, etc. with which the client computing objects or devices 820, 822, 824, 826, 828, etc. communicate via any of a number of known protocols, such as the hypertext transfer protocol (HTTP). Objects 810, 812, etc. can also serve as client computing objects or devices 820, 822, 824, 826, 828, etc., as can be characteristic of a distributed computing environment.

Exemplary Computing Device

Figure 9:
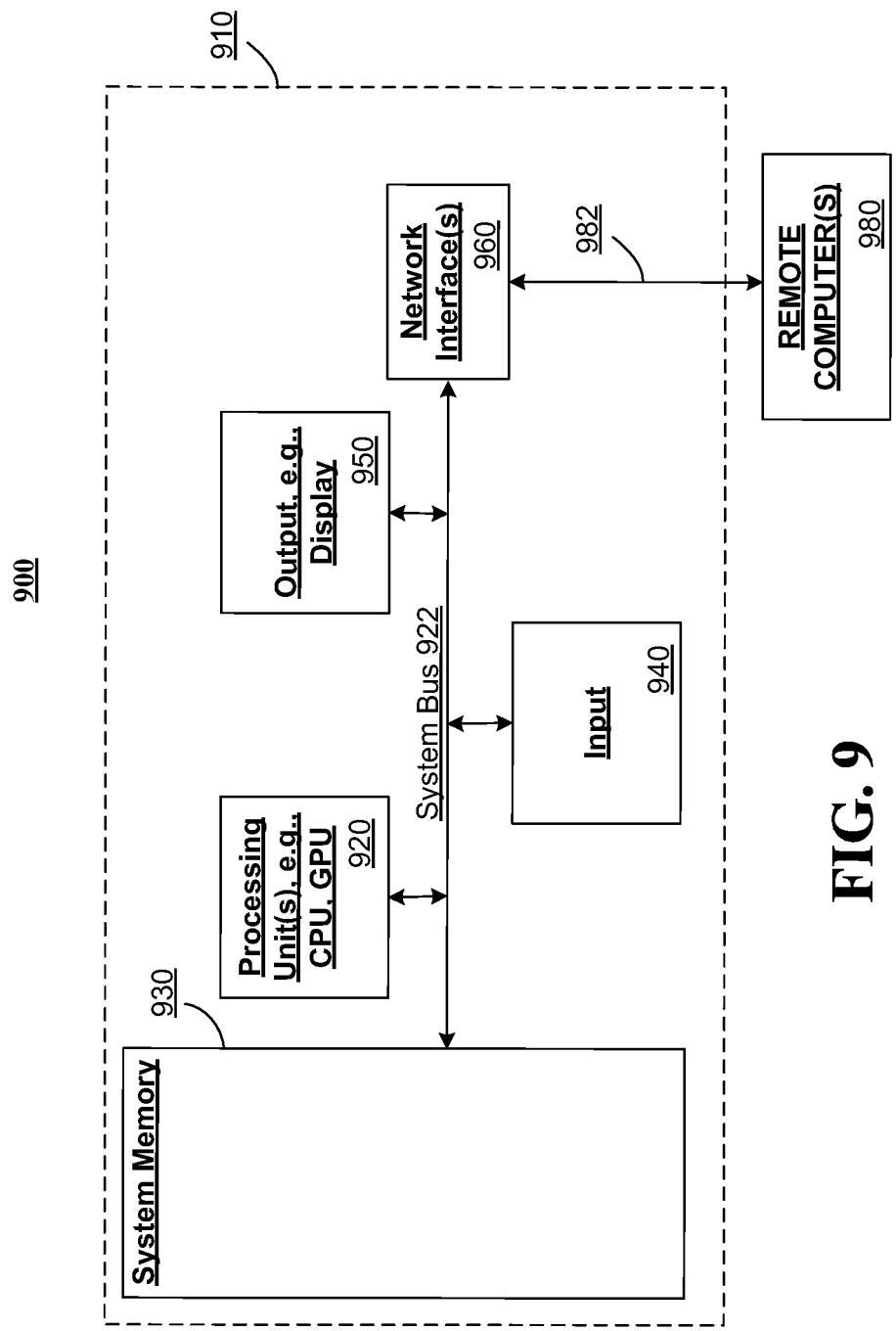
FIG. 9 is an illustration of a schematic diagram of an exemplary computing environment for implementing one or more embodiments described in this disclosure.

As mentioned, advantageously, the techniques described in this disclosure can be applied to any suitable device. It is to be understood, therefore, that handheld, portable and other computing devices and computing objects of all kinds are contemplated for use in connection with the various embodiments, i.e., anywhere that a device may wish to read or write transactions from or to a data store. Accordingly, the below remote computer described below in FIG. 9 is but one example of a computing device. Additionally, a suitable server can include one or more aspects of the below computer, such as a media server or other media management server components.

Although not required, embodiments can be partly implemented via an operating system, for use by a developer of services for a device or object, and/or included within application software that operates to perform one or more functional aspects of the various embodiments described in this disclosure. Software can be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 9 thus illustrates an example of a suitable computing system environment 900 in which one or aspects of the embodiments described in this disclosure can be implemented, although as made clear above, the computing system environment 900 is only one example of a suitable computing environment and is not intended to suggest any limitation as to scope of use or functionality. Neither is the computing environment 900 to be interpreted as having any dependency or requirement relating to any one or combination of components illustrated in the exemplary computing environment 900.

With reference to FIG. 9, an exemplary computing environment 900 for implementing one or more embodiments includes a computing device in the form of a computer 910 is provided. Components of computer 910 can include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 can include computer storage media in the form of volatile and/or nonvolatile memory such as read only memory (ROM) and/or random access memory (RAM). By way of example, and not limitation, memory 930 can also include an operating system, application programs, other program modules, and program data.

A user can enter commands and information into the computer 910 through input devices 940, non-limiting examples of which can include a keyboard, keypad, a pointing device, a mouse, stylus, touchpad, touch screen, trackball, motion detector, camera, microphone, joystick, game pad, scanner, video camera or any other device that allows the user to interact with the computer 910. A monitor or other type of display device can be also connected to the system bus 922 via an interface, such as output interface 950. In addition to a monitor, computers can also include other peripheral output devices such as speakers and a printer, which can be connected through output interface 950.

The computer 910 can operate in a networked or distributed environment using logical connections to one or more other remote computers, such as remote computer 980. The remote computer 980 can be a personal computer, a server, a router, a network PC, a peer device or other common network node, or any other remote media consumption or transmission device, and can include any or all of the elements described above relative to the computer 910. The logical connections depicted in FIG. 9 include a network 982, such local area network (LAN) or a wide area network (WAN), but can also include other networks/buses e.g., cellular networks.

As mentioned above, while exemplary embodiments have been described in connection with various computing devices and network architectures, the underlying concepts can be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques detailed herein. Thus, embodiments herein are contemplated from the standpoint of an API (or other software object), as well as from a software or hardware object that implements one or more aspects described in this disclosure. Thus, various embodiments described in this disclosure can have aspects that are wholly in hardware, partly in hardware and partly in software, as well as in software.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, electrically erasable programmable read only memory (EEPROM), flash memory or other memory technology, compact disc read only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

It is to be understood that the embodiments described in this disclosure can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described in this disclosure, or a combination thereof.

When the embodiments are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described in this disclosure can be implemented with modules or components (e.g., procedures, functions, and so on) that perform the functions described in this disclosure. The software codes can be stored in memory units and executed by processors. A memory unit can be implemented within the processor or external to the processor, in which case it can be communicatively coupled to the processor via various structures.

The word "exemplary" is used herein to mean serving as an example, instance, or illustration. For the avoidance of doubt, the subject matter disclosed herein is not limited by such examples. In addition, any aspect or design described in this disclosure as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Moreover, use of the term "an embodiment" or "one embodiment" throughout is not intended to mean the same embodiment unless specifically described as such. Further, use of the term "plurality" can mean two or more.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components can be combined into a single component providing aggregate functionality or divided into several separate sub-components, and that any one or more middle layers, such as a management layer, can be provided to communicatively couple to such sub-components in order to provide integrated functionality. Any components described in this disclosure can also interact with one or more other components not specifically described in this disclosure but generally known by those of skill in the art.

In view of the exemplary systems described above methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described in this disclosure. Where non-sequential, or branched, flow is illustrated via flowchart, it can be appreciated that various other branches, flow paths, and orders of the blocks, can be implemented which achieve the same or a similar result. Moreover, not all illustrated blocks can be required to implement the methodologies described in this disclosure after.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be provided across a plurality of devices. The present disclosure is not to be limited to any single embodiment, but rather can be construed in breadth, spirit and scope in accordance with the appended claims.

What is claimed is:

1. A system, comprising:
a memory storing computer executable components; and
a processor configured to execute the following computer executable components stored in the memory:
  a communication component that receives a video;
  a segmentation component that obtains a frame from the video; and
  a selection component that determines an object selected within the frame and comprises a classifier trained using a probability map stored in the memory, wherein the probability map comprises information indicative of a likelihood that a pixel in the frame corresponds to the object, and is generated based, at least, on:
    information indicative of masking of a plurality of objects with one or more colors, the masking generated by a plurality of users and the plurality of objects being included in a scene of the frame;

differentiation of the plurality of objects based, at least, on a level of commonality between the masking of the plurality of objects; and selection of information associated with masked regions of the frame wherein the level of commonality between the masking is greater than or substantially equal to a defined threshold.

2. The system of claim 1, wherein the differentiation comprises:

for one or more of the frames having masking of the plurality of objects:

separation of the frame into a plurality of electronic layers composed of one of the one or more colors;

a comparison of the plurality of electronic layers for one of the plurality of users with the plurality of electronic layers for other ones of the plurality of users; and a selection of a one of the plurality of electronic layers having a greatest level of overlap with the other ones of the plurality of electronic layers.

3. The system of claim 1, further comprising a supplemental content delivery component that determines an advertisement based, at least, on the object identified.

4. A method of detecting an object by a classifier, comprising:

receiving, by a device comprising a processor, a video;

obtaining a frame from the video; and determining an object selected within the frame, wherein the determining comprises:

searching a probability map for the object, wherein generating the probability map is based, at least on:

processing information indicative of masking of a plurality of objects with one or more colors, the masking performed by a plurality of users and the plurality of objects being included in a scene of the frame;

differentiating the plurality of objects based, at least, on a level of commonality between the masking of the plurality of objects; and selecting information associated with masked regions of the frame wherein the level of commonality between the masking is greater than or equal to a defined threshold.

5. A method comprising:

differentiating, by a device comprising a processor, a plurality of objects in a frame based, at least, on a level of commonality between masking of the plurality of objects in one or more colors;

discarding information associated with masked regions of the frame wherein the level of commonality between the masking is less than a defined threshold; and generating a probability map based, at least, on the level of commonality between the masking, the probability map comprising information indicative of a likelihood that a location in the frame corresponds to a particular one of the plurality of objects.

6. The method of claim 5, further comprising:

extracting a plurality of frames from the media, the plurality of frames depicting a same scene;

distributing the plurality of frames; and receiving information indicative of masking of the plurality of objects in the one or more colors.

7. The method of claim 5, wherein the differentiating comprises:

normalizing the one or more colors associated with the plurality of objects, wherein the normalizing comprises:

for one or more of the frames for which masking is performed:

separating a frame into a plurality of electronic layers, the plurality of electronic layers being composed of one of the one or more colors with which masking is performed;

comparing the plurality of electronic layers for one of the plurality of users with the plurality of electronic layers for other ones of the plurality of users; and selecting an electronic layer having a greatest level of overlap with the other ones of the plurality of electronic layers.

8. A method, comprising:

receiving, by a device comprising a processor, information indicative of a selection of a location in a frame;

determining a pixel associated with the location in the frame; and determining an object associated with the pixel based, at least, on evaluating a probability map of the frame, wherein generation of the probability map comprises:

receiving information indicative of masking of a plurality of objects with one or more colors, the masking performed by a plurality of users and the plurality of objects being included in a scene of the frame;

differentiating the plurality of objects based, at least, on a level of commonality between the masking of the plurality of objects;

discarding information associated with masked regions of the frame wherein the level of commonality between the masking is less than a defined threshold; and generating the probability map based, at least, on the level of commonality between the masking, wherein the probability map comprises information indicative of a likelihood that a pixel in the frame corresponds to the object.

9. The method of claim 8, further comprising delivering an advertisement based, at least, on a determined object.

10. The method of claim 8, further comprising delivering a service based, at least, on a determined object.

11. The method of claim 8, further comprising offering a location for purchase in the frame, based, at least, on a location of a determined object.

12. A system, comprising:

a memory storing computer executable components; and a processor configured to execute the following computer executable components stored in the memory:

a communication component that:

distributes a plurality of frames of a video to a plurality of users, the plurality of frames depicting a same scene; and receives information indicative of masking of a plurality of objects with one or more colors, the masking performed by the plurality of users and the plurality of objects being included in the scene; and a video object recognition component that:

differentiates the plurality of objects based, at least, on a level of commonality between the masking of the plurality of objects;

discards information associated with masked regions of the frame wherein the level of commonality between the masking is less than a defined threshold; and generates a probability map based, at least, on the level of commonality between the masking, wherein the probability map comprises information indicative of a likelihood that a location in the frame corresponds to a particular one of the plurality of objects.

13. The system of claim 12, further comprising an extraction component that extracts the frame from the video.

14. The system of claim 12, wherein differentiation comprises:
normalization of the one or more colors associated with the plurality of objects, the normalization comprising:
for one or more of the frames with which masking is performed:
separating the frame into a plurality of electronic layers, the electronic layers being composed of one of the one or more colors with which masking is performed;
comparing the electronic layers for one of the plurality of users with the plurality of electronic layers for other ones of the plurality of users; and
selecting an electronic layer having a greatest level of overlap with the other ones of the electronic layer.

15. The system of claim 12, wherein the communication component also receives information indicative of selection of one of the plurality of objects.

16. The system of claim 15, further comprising a supplemental content delivery component that delivers an advertisement based, at least, on the selection of one of the plurality of objects.

17. The system of claim 15, further comprising a service delivery component that delivers a service based, at least, on the selection of one of the plurality of objects.

18. The system of claim 15, further comprising a supplemental content delivery component that offers one or more locations of the frame for purchase based, at least, on the selection of the one of the plurality of objects.

19. A non-transitory computer-readable medium storing computer-executable instructions that, in response to execution, cause a device comprising a processor to perform operations, comprising:
differentiating a plurality of objects in a frame based, at least, on a level of commonality between masking of the plurality of objects in one or more colors;
discarding information associated with masked regions of the frame wherein the level of commonality between the masking is less than a defined threshold; and
generating a probability map based, at least, on the level of commonality between the masking, the probability map comprising information indicative of a likelihood that a location in the frame corresponds to a particular one of the plurality of objects.

20. The non-transitory computer-readable medium of claim 19, further comprising:
extracting a plurality of frames from the media, the plurality of frames depicting a same scene;
distributing the plurality of frames; and
receiving information indicative of masking of the plurality of objects in the one or more colors.

21. The non-transitory computer-readable medium of claim 19, wherein the differentiating comprises:
normalizing the one or more colors associated with the plurality of objects, wherein the normalizing comprises:
for one or more of the frames for which masking is performed:
separating a frame into a plurality of electronic layers, the plurality of electronic layers being composed of one of the one or more colors with which masking is performed;
comparing the plurality of electronic layers for one of the plurality of users with the plurality of electronic layers for other ones of the plurality of users; and
selecting an electronic layer having a greatest level of overlap with the other ones of the plurality of electronic layers.

* * * * *